United States Patent
Wiercinski et al.

(10) Patent No.: US 10,267,049 B2
(45) Date of Patent: Apr. 23, 2019

(54) METHOD FOR PRE-APPLIED WATERPROOFING

(71) Applicant: W. R. Grace & Co.-Conn., Columbia, MD (US)

(72) Inventors: Robert A. Wiercinski, Lincoln, MA (US); Anandakumar Ranganathan, Lexington, MA (US)

(73) Assignee: GCP Applied Technologies Inc., Cambridge, MA (US)

(*) Notice: Subject to any disclaimer, the term of this patent is extended or adjusted under 35 U.S.C. 154(b) by 716 days.

(21) Appl. No.: 14/920,306

(22) Filed: Oct. 22, 2015

(65) Prior Publication Data
US 2016/0040440 A1 Feb. 11, 2016

Related U.S. Application Data

(60) Division of application No. 13/434,157, filed on Mar. 29, 2012, which is a continuation of application No. PCT/US2010/050396, filed on Sep. 27, 2010.

(60) Provisional application No. 61/247,374, filed on Sep. 30, 2009.

(51) Int. Cl.
| | | |
|---|---|---|
| *E04F 15/18* | (2006.01) | |
| *B32B 7/12* | (2006.01) | |
| *B32B 27/08* | (2006.01) | |
| *E02D 31/00* | (2006.01) | |
| *E04D 5/10* | (2006.01) | |
| *E04B 1/66* | (2006.01) | |
| *E04F 15/12* | (2006.01) | |
| *C09J 7/38* | (2018.01) | |
| *C09J 7/40* | (2018.01) | |
| *C09J 7/21* | (2018.01) | |

(52) U.S. Cl.
CPC .............. *E04F 15/181* (2013.01); *B32B 7/12* (2013.01); *B32B 27/08* (2013.01); *C09J 7/21* (2018.01); *C09J 7/38* (2018.01); *C09J 7/40* (2018.01); *E02D 31/002* (2013.01); *E04B 1/665* (2013.01); *E04D 5/10* (2013.01); *E04F 15/12* (2013.01); *C09J 2400/263* (2013.01); *C09J 2409/00* (2013.01); *C09J 2431/005* (2013.01); *C09J 2433/005* (2013.01); *C09J 2453/00* (2013.01); *Y10T 428/2835* (2015.01)

(58) Field of Classification Search
None
See application file for complete search history.

(56) References Cited

U.S. PATENT DOCUMENTS 5,496,615 A * 3/1996 Bartlett ............... C09J 7/02
428/144
5,626,954 A * 5/1997 Andersen ............. B01F 3/1214
428/294.7

* cited by examiner

*Primary Examiner* — Nathan T Leong
(74) *Attorney, Agent, or Firm* — Craig K. Leon

(57) ABSTRACT

Disclosed is a waterproofing membrane that comprises a carrier sheet, a pressure sensitive adhesive layer on one surface of the carrier sheet, and a protective coating layer on the adhesive layer. The protective coating layer comprises polyvinyl acetate (PVAc). The protective coating layer protects the membrane against weather exposure, tolerates foot traffic and strongly adheres to concrete cast against it.

10 Claims, 1 Drawing Sheet

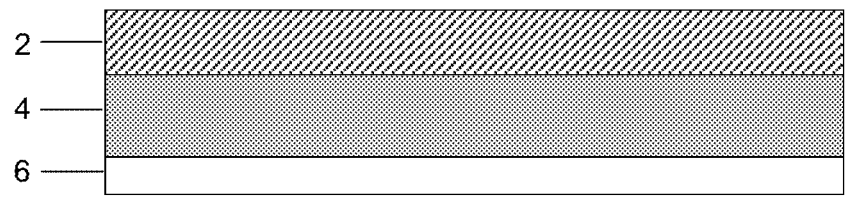

METHOD FOR PRE-APPLIED WATERPROOFING

CROSS-REFERENCE TO RELATED APPLICATIONS

This is a divisional application based on U.S. Ser. No. 13/434,157 filed Mar. 29, 2012 (pending), which was a continuation of application PCT/US2010/050396 filed Sep. 27, 2010, which claims priority from application U.S. Ser. No. 61/247,374 filed on Sep. 30, 2009, the disclosures of which are incorporated herein by reference.

FIELD OF THE INVENTION

The present invention relates to a pre-applied waterproofing membrane that will adhere to concrete applied against its surface.

BACKGROUND OF THE INVENTION

Sheet-like waterproofing membrane laminates are well-known for application to concrete and other substrates. These laminates typically comprise a carrier sheet and a pressure sensitive adhesive layer. In many applications, the waterproofing sheet material is applied to a concrete substrate that has already been formed, such as a building foundation. In such a case, the adhesive layer of the membrane is applied against the cured concrete surface. In another technique, the waterproofing membrane is affixed to the concrete form or lagging with the carrier sheet against the lagging and the adhesive portion facing toward the cavity in which the concrete is poured. The adhesive portion of the membrane will adhere to the freshly poured concrete, thus providing a fully adhered waterproofing membrane on the cured concrete surface after the lagging is removed. This technique is sometimes referred to as "blind side" (or pre-applied) waterproofing. A similar process may be used on horizontal surfaces where the membrane is applied to compacted soil or gravel or to a concrete slab, with the adhesive portion facing upward, then casting concrete against the membrane.

In addition to the carrier sheet and pressure sensitive adhesive layer, typical commercial waterproofing membranes include a removable release sheet that is used to prevent the adhesive portion of the membrane from adhering to the carrier sheet or other portion of the membrane when the membrane is rolled up. This release sheet must be removed from the membrane prior to or during installation and disposed in the trash, thus creating environmental waste.

U.S. Pat. No. 3,900,102 (Hurst) discloses one such membrane comprising a polyethylene support sheet, a bituminous adhesive and a releasable siliconized paper for protecting the adhesive. The release paper is removed as the membrane is unrolled and adhered to a building substrate (see Hurst FIG. 4). U.S. Pat. No. 4,751,122 (May) discloses a membrane laminate that includes a sheet-like paper substrate with a release coating (e.g., silicone) on one face and a waterproofing pressure sensitive adhesive on the other face. This membrane also includes a removable strip along the edge which, when removed, permits overlapping seams to adhere. U.S. Pat. No. 4,172,830 (Rosenberg) and U.S. Pat. No. 4,215,160 (Rosenberg) disclose paperless membrane laminates that include a silicone release coating on the outer surface of the carrier sheet to prevent the adhesive layer from adhering to the carrier sheet when the membrane is rolled up. U.S. Pat. No. 5,254,661 (Wilson) discloses a similar type of paperless membrane laminate in which the release coating is a water-based silicone emulsion. During installation, edge portions of the release coating may be removed by wet abrasion to permit adhesion of overlap seams of adjacent membranes.

U.S. Pat. No. 4,994,328 (Cogliano) discloses a waterproofing membrane capable of adhering to freshly poured concrete (i.e., blind-side or pre-applied waterproofing). The membrane has a bituminous adhesive layer that is coated with a non-tacky, water-insoluble polymeric coating such as, for example, a polyvinyl alcohol, silica, and glycerin mixture in a weight ratio of 1:10:0.5. The coating purportedly protects the adhesive layer while permitting a strong adhesive bond to freshly poured concrete. However, the coating can be slippery when wet and, thus, not suitable for foot traffic. U.S. Pat. No. 5,316,848 (Bartlett) discloses a similar blind-side waterproofing membrane that includes a carrier layer, a pressure sensitive adhesive layer, and a protective coating on the adhesive layer, wherein the coating may be selected from various types of polymers, preferably an acrylic-based elastomer, such as styrene butyl acrylate. U.S. Pat. No. 5,496,615 (Bartlett) discloses a similar membrane laminate where the protective coating has a finely divided particulate material, such as sand, calcium carbonate, cement, titanium dioxide, etc., dusted thereon.

U.S. Pat. No. 6,500,520 (Wiercinski) discloses a membrane laminate having a carrier support sheet, an adhesive layer, and embedded on the adhesive layer a layer of granulated inorganic particulates capable of reacting with concrete, such as aluminum oxide trihydrate, silica dioxide, fly ash, blast furnace slag, alkali or alkaline earth metal salts, etc. The particles may be attached to the adhesive layer using a water-soluble material such as ethylene vinyl acetate or polyvinyl alcohol.

Typical commercial waterproofing membranes used for blind-side (or pre-applied) applications include a release sheet and unroll wrong side up with the adhesive portion facing downward. This forces the installer to first unroll then flip over a large, unwieldy membrane prior to installing it. Alternatively, two installers are needed to lift the heavy roll so that it may be unrolled with the correct side facing upward.

It would be advantageous to provide a waterproofing membrane that binds strongly to concrete cast against its surface. In addition, it would be advantageous to provide a waterproofing membrane that has an outer surface that will easily tolerate foot traffic. It would also be advantageous to provide a waterproofing membrane that does not require a release sheet that must be removed and disposed of at the job site. In addition, it would be advantageous to provide a waterproofing membrane that is right side up (i.e., carrier sheet facing down and adhesive/protective coating facing up) when it is unrolled at the job site.

SUMMARY OF THE INVENTION

The present invention embraces a waterproofing membrane in the form of a sheet-like laminate that comprises a carrier sheet, a pressure sensitive adhesive layer on one surface of the carrier sheet, and a protective coating layer on the adhesive layer. The protective coating layer comprises polyvinyl acetate (PVAc). Although not necessary, the waterproofing membrane also may optionally include a removable release sheet on the protective coating layer to prevent the membrane from adhering to itself when rolled up. The protective coating layer protects the membrane against weather exposure, tolerates foot traffic and strongly adheres to concrete cast against it.

The present invention also embraces a method of waterproofing a concrete structure by applying a waterproofing membrane as defined herein to a building substrate or concrete form with the protective coating layer of the membrane facing the area into which the concrete will be cast, and casting concrete such that it contacts the protective coating layer of the membrane.

BRIEF DESCRIPTION OF THE DRAWINGS

FIG. 1 depicts a cross-section of a waterproofing membrane of the present invention.

DETAILED DESCRIPTION OF THE INVENTION

One embodiment of the waterproofing membrane of the present invention is depicted in FIG. 1, which shows a cross-section of the membrane taken along the width of the membrane. Typical commercial membranes are in the form of a sheet-like laminate with a width in the range of about 30 to 185 cm, more typically about 60 to 140 cm, preferably about 80 to 130 cm, and a length of about 5 to 60 m, more typically about 15 to 36 m, and are rolled up into a roll. These membranes generally have a thickness of about 0.15 mm to about 5 mm, more typically about 0.25 mm to about 2.5 mm, preferably about 0.25 mm to about 1.8 mm.

As shown in FIG. 1, the waterproofing membrane comprises at least three laminated layers. The first layer is a carrier sheet 2 and the second layer is an adhesive layer 4, which is adhered to one surface (i.e., a first surface) of the carrier sheet. The third layer of the waterproofing membrane is a protective coating layer 6 on the adhesive layer 4. Optionally, the waterproofing membrane may include a removable release sheet (not shown) on the protective coating layer 6. As depicted, the protective coating layer 6 is on the side of the adhesive layer 4 that is opposite the side of the adhesive layer that is adhered to the carrier sheet 2. The waterproofing membrane may optionally include additional layers of material on either face of the carrier sheet as desired. For example, a second adhesive layer may be adhered to the other surface (i.e., a second surface opposite the first surface) of the carrier sheet (e.g., to enable the membrane to be adhered to a substrate). The adhesive layer 4 is adhered either directly onto a surface of the carrier sheet, or indirectly if there is an optional additional layer of material interposed between the carrier sheet 2 and the adhesive layer 4. The protective coating layer 6 may optionally include a coating or dusting of finely divided inorganic particulate material, such as sand or calcium carbonate, on its outer exposed surface.

The carrier sheet 2 provides mechanical strength and waterproofing integrity for the membrane. The carrier sheet typically will have a thickness of about 0.05 to 2.0 mm, preferably about 0.3 to 1.0 mm, and should comprise a generally smooth surface, such as is provided by films, sheets, fabrics, and extrusion coated woven and non-woven fabrics. Suitable materials for films and extrusion coatings include polypropylene, polyethylene, ethylene-propylene copolymers, ethylene-olefin copolymers, ethylene-vinyl acetate copolymers, polyvinyl acetate, polyethyl acrylate, polytetrafluoroethylene (PTFE), polyvinylidene fluoride (PVDF), polyethylene terephthalate (PET), polyvinyl chloride (PVC), polyamides and combinations thereof. Polyethylene and polypropylene are preferred. A preferred carrier sheet comprises a thermoplastic film of high density polyethylene (HDPE). Fabrics may be woven or non-woven and may comprise polyethylene, polypropylene, polyethylene terephthalate and polyamide. A woven polypropylene fabric is particularly suitable.

Generally, the carrier sheet is not surface treated to increase the surface tension. However, in some cases it may be desirable to treat the surface of the carrier sheet on which the adhesive will be applied in order to enhance adhesion of the adhesive to the carrier sheet. One such surface treatment option is corona treatment. Preferably, the carrier sheet will not be corona treated, particularly the surface of the carrier sheet that comes in contact with the protective coating layer 6.

Additives may be incorporated into the carrier material to reduce surface tension. These may be incorporated into the bulk of the material in a separate compounding step. The additives may also be incorporated into the bulk of the material during the melt extrusion process to produce a sheet, film, or extrusion coated fabric.

The adhesive layer 4 may comprise a non-bituminous pressure sensitive adhesive or a rubber modified bitumen pressure sensitive adhesive. The adhesive layer typically will have a thickness of about 0.05 to 2.5 mm, preferably about 0.07 to 2.0 mm, more preferably about 0.1 to 1.0 mm, most preferably about 0.13 to 0.8 mm.

Suitable non-bituminous, or synthetic, pressure sensitive adhesives include butyl rubber based adhesives, polyisobutylene based adhesives, butyl based adhesives, acrylic based adhesives, vinyl ether based adhesives, styrene-isoprene-styrene (SIS) based adhesives, styrene-ethylene-butylene-styrene (SEBS) based adhesives, styrene-butadiene-styrene (SBS) based adhesives, styrene-butadiene rubber (SBR) based adhesives, and combinations thereof. Preferably, the synthetic adhesive is a pressure sensitive hot melt adhesive block copolymer of SIS, SBS or SEBS, most preferably SIS block copolymer. For a more detailed description of pressure sensitive adhesives, see Satas, Handbook Of Pressure Sensitive Adhesive Technology, by Van Nostrand Reinhold Company, Inc. (1982), incorporated herein by reference. Other rubbers include polyisoprene, polybutadiene, natural rubber, polychloroprene rubber, ethylene-propylene rubber, ethylene alpha olefin, nitrile rubbers, and acrylic rubber.

Other suitable non-bituminous synthetic pressure sensitive adhesives may comprise amorphous polyolefins. Amorphous polyolefin (APO) is defined as polyolefin with a degree of crystallinity of less than 30% as measured by differential scanning calorimetry. These polymers can be either homopolymers of propylene or copolymers of propylene with one or more α-olefin comonomer, such as, for example, ethylene, 1-butene, 1-hexene, 1-octene and 1-decene. The APO polymers of the types herein described above are commercially available from Eastman Chemical Company, Kingsport, Tenn., under the trade name designation Eastoflex or from Huntsman Corporation, Houston, Tex., under the trade name designation Rextac or from Degussa Corporation, Parsipanny, N.J., under the trade name designation Vestoplast. Like rubber based adhesives, these are also combined with a tackifier and plasticizer to produce a pressure sensitive adhesive. See Eastman bulletin "Pressure-Sensitive Adhesives Based on Amorphous Polyolefin From Eastman Chemical Company"

Hot melt adhesives based on amorphous polyolefins are suitable as well. In comparison to pressure sensitive adhesives these are not tacky and generally comprise only APO, tackifier, and polyolefin wax. Refer to Eastman brochure "Formulating Hot Melt Adhesives Based on Epolene Polymers." Hot melt adhesives based on ethylene vinyl acetate are also suitable. See "DuPont Elvax for Adhesives, Sealants, and Wax Blends."

The non-bituminous or synthetic pressure sensitive adhesive can optionally contain typical additives, such as light absorbers (e.g., carbon black, benzotriazoles, hydroxyphenyl-triazine, benzophenones, etc.), light stabilizers (e.g., hindered amines), antioxidants (e.g., hindered phenols), fillers (e.g., calcium carbonate, silica, titanium dioxide, etc.), plasticizers, rheological additives, and mixtures thereof. Preferred synthetic adhesives contain light absorbers, light stabilizers, and antioxidants.

A rubber modified bitumen pressure sensitive adhesive may also be used. All of the rubbers listed above (e.g., SIS, SBS, SEBS, SBR, etc.) may be blended with bitumen to produce a pressure sensitive adhesive. The rubber modified bitumen may also typically include a processing oil such as an aromatic, naphthenic or paraffinic oil. For unfilled adhesives, the wt. % rubber is about 10% to 22%; the wt. % bitumen is about 43% to 90%; and the wt. % processing oil is about 0% to 35%. The pressure sensitive adhesive may also comprise an inorganic filler such as silica, calcium carbonate, talc, or clay. If present, the wt. % filler may be about 0% to 50% of the total.

Generally, for improved adhesion to post cast concrete it is preferred that the pressure sensitive adhesive has a penetration greater than about 30 decimillimeters (dmm) (150 g, 5 sec., 70° F.) as measured according to ASTM D 5-73, incorporated herein by reference.

The protective coating layer 6 has several functions. It protects the membrane against exposure to weather, it tolerates foot traffic, and, most importantly, it operates to bond to concrete cast against it. In a preferred embodiment, it can also prevent the membrane from adhering to itself when the membrane is rolled up, thus making it possible to dispense with the need for a release liner. The protective coating layer comprises polyvinyl acetate. Preferably, the protective coating layer (exclusive of any optional inorganic fillers and pigments) comprises, by weight of the coating layer, at least 40% polyvinyl acetate, more preferably at least 50% polyvinyl acetate, and most preferably at least 60% polyvinyl acetate.

While not being bound by theory, it is believed that the polyvinyl acetate layer partially hydrolyzes in the presence of the strong aqueous alkaline environment of wet concrete to form polyvinyl alcohol. The water soluble polyvinyl alcohol dissolves in the concrete paste and becomes intimately bonded with the concrete once the concrete has set. Since the polyvinyl acetate is not easily hydrolyzed at lower pH, e.g. pH 7, it cannot be washed off by rain. The polyvinyl acetate layer is also non-tacky and will not bond well to the carrier sheet 4, thus permitting easy unrolling of the membrane and eliminating the need for a release liner. The polyvinyl acetate layer is also highly resistant to oil absorption.

Solid polyvinyl acetate homopolymer (100% solids) is available from Wacker Chemie AG and Wacker Chemical Corporation under the trade name Vinnapas®. The molecular weight ranges from 10,000 g per mole to 500,000 g per mole. Polyvinyl acetate homopolymer is also manufactured by McGean.

Preferred solid polyvinyl acetate homopolymers are those with molecular weight ranging from 20,000 g per mole to 350,000 g per mole. Typically, these will have a glass transition temperature in the range from 33° C. to 44° C. depending on the molecular weight. Generally, the higher molecular weight polymers have higher glass transition temperatures.

A solvent based polyvinyl acetate homopolymer may also be used. Typically, the solids level is about 40%. The solvent may be, for example, an acetone ethanol mixture, and the solution may have a Brookfield solution viscosity of about 16,000 cps with spindle no. 3 at 5 rpm. This polymer is identified as PVAc polymer A in Example 1 (Table 1). See also Table 2, nos. 5 and 6.

Polyvinyl acetate homopolymer emulsions are also suitable and are available from a number of suppliers. Polyvinyl acetate homopolymer emulsion is available from Dow under the tradename Rovace, including, for example, Rovace 117, Rovace 5140, and Rovace 571. Polyvinyl acetate homopolymer emulsions are also available from Celanese under the trade names TufCOR 3025, Dur-O-Set C-310, C-323, and C-335, Resyn 1025, Resyn 1072, Resyn 1601, and Resyn 5763.

The protective coating may be formed from solid polymer, from solvent based polymer solution or from an aqueous emulsion. The aqueous emulsion may comprise an aqueous emulsion of polyvinyl acetate homopolymer as the sole polymer or a blend of an aqueous emulsion of polyvinyl acetate and an aqueous emulsion of one or more of the polymers or copolymers described below.

Since polyvinyl acetate homopolymer is somewhat brittle, it may be desirable to blend the PVAc with a softening material, such as a plasticizer or one or more flexible polymers. Flexible polymers that are miscible (single phase blend) or compatible (two phase blend) are preferred. These include chlorinated paraffins, polymethylacrylate, polyethylacrylate, copolymers of methyl acrylate and acrylic acid (10% to 20% acrylic acid), copolymers of ethyl acrylate and acrylic acid (10% to 20% acrylic acid), copolymers of butyl acrylate and acrylic acid (10% to 20% acrylic acid), copolymers of vinyl acetate with ethylene, copolymers of vinyl acetate and acrylic esters including methyl acrylate, ethyl acrylate, butyl acrylate, and ethyl-hexyl acrylate, copolymers of vinyl acetate and vinyl versatate, and copolymers of vinyl acetate and vinyl laurate. Preferably, the polyvinyl acetate homopolymer will comprise at least 40%, more preferably at least 50%, most preferably at least 60%, by weight of the polymer blend.

Copolymers of a vinyl acetate and vinyl laurate are available from Wacker, also under the tradename Vinnapas®. Two such products are Vinnapas® B500/VL20 and Vinnapas® B500/VL 40, which comprise 20% vinyl laurate and 40% vinyl laurate, respectively. These copolymers have glass transition temperatures of 21° C. and 0° C., respectively, and are solid resins. Preferably, the minimum vinyl acetate content for a suitable copolymer of vinyl acetate and vinyl laurate is at least 50% by weight.

Blends of polyvinyl acetate with copolymers of acrylic acid and acrylic esters described above are not known to be commercially available. However, such blends are described in U.S. Pat. No. 5,171,777 entitled "Miscible blends of poly(vinyl acetate) and polymers of acrylic acid."

Copolymers of vinyl acetate and butyl acrylate are available from several commercial sources, including, for example, Dow Chemical, such as UCAR 162 and UCAR 357. These have glass transition temperatures of 12° C. and 23° C., respectively, and are available as aqueous emulsions. The manufacturer does not publish comonomer contents. Using the Fox equation ($1/T_{gblend}=W_A/T_{gA}+W_B/T_{gB}$, where $W_A$ & $W_B$ are the weight fraction of each monomer), a glass transition temperature for polyvinyl acetate of 33° C.

and a glass transition temperature for poly butyl acrylate of −49° C., one can calculate the vinyl acetate content of UCAR 162 and UCAR 357 as 80% and 91%, respectively. Preferably, the minimum vinyl acetate content for copolymers of vinyl acetate and butyl acrylate is at least 50% by weight.

Copolymers of vinyl acetate and an acrylic ester are also available from Air Products, such as, for example, Flexbond® 325, which is a copolymer of vinyl acetate and butyl acrylate, and Flexbond® 381. These have glass transition temperatures of 12° C. and 19° C., respectively, and are available as aqueous emulsions. Preferably, the minimum vinyl acetate content for copolymers of vinyl acetate and an acrylic ester is 50% by weight. Although 100% solids forms of copolymers of vinyl acetate and acrylic esters with high vinyl acetate content have not been identified yet, the aforementioned emulsions may be dried to produce solid polymers that are suitable for producing blends with solid polyvinyl acetate homopolymer. Blends may be formed by compounding the PVAc homopolymer and the desired copolymers in the melt. Blends may also be formed by dissolving the PVAc homopolymer and the desired copolymer in an organic solvent and removing the solvent via evaporation, providing that the polymer has a low enough molecular weight to be soluble. One can test the ability to form a solution using a minimum solids content of 10%. If the molecular weight is too high, the polymer will not dissolve, partially dissolve, swell, or exhibit partial solvation and swelling. Flexbond 325, Flexbond 318, and UCAR 357 are soluble via this test. UCAR 162 is not.

Copolymers of vinyl acetate and ethylene with high vinyl acetate content are available from Air Products, such as, for example, Airflex® 7200, Airflex® 400, and Airflex® EF500, which are aqueous emulsions. Although 100% solids forms of copolymers of vinyl acetate and ethylene with high vinyl acetate content have not been identified yet, blends of these copolymers with polyvinyl acetate may be produced as described in the previous paragraph for the vinyl acetate acrylic ester copolymers. The glass transition temperatures for the aforementioned three copolymers are 0° C., 0° C., and 5° C., respectively. Using the Fox equation, a glass transition temperature for polyvinyl acetate of 33° C. and a glass transition temperature for polyethylene of −80° C., one can calculate the vinyl acetate contents of the three copolymers as 80%, 80%, and 83%, respectively. Preferably, the minimum vinyl acetate content for copolymers of vinyl acetate and ethylene is at least 70% by weight.

Polymethyl acrylate is available as a 40% solution in toluene from Aldrich and has a glass transition temperature of 6° C. Solid polyethyl acrylate is available from Zeon Chemicals as Hytemp 4051 and has a glass transition temperature of approximately −23° C.

Copolymers of vinyl acetate and vinyl versatate are available from Hexion under the trade name of Axilat PAV and have glass transition temperatures in the range from 9° C. to 16° C. These are redispersible powders that were produced as aqueous emulsions and then spray dried. If used as an aqueous emulsion composition, the dry powder is mixed with water and high shear to disperse the powder to form an emulsion. Preferably, the minimum vinyl acetate content for copolymers of vinyl acetate and vinyl versatate is at least 50% by weight.

Polyvinyl acetate homopolymer may also be blended with a plasticizer to increase flexibility. Suitable plasticizers include, but are not limited to, phthalates (e.g., dimethyl-, diethyl-, dibutyl-, and butylbenzyl-phthalate), benzoates (e.g., diethylene glycol dibenzoate and dipropylene glycol dibenzoate), phosphates (tributyl-, tricresyl-, triphenyl-, and tributoxyethyl-phosphate), and triacetine (glycerol triacetate). Generally, the plasticizer level may be any suitable amount sufficient to soften the polyvinyl acetate protective coating layer, with the maximum plasticizer level being no more than 30% by weight of the protective coating layer (i.e., the combination of plasticizer plus polyvinyl acetate homopolymer).

The polyvinyl acetate homopolymer layer may comprise other ingredients selected from a list including antioxidants, hindered amine light stabilizers, UV absorbers, pigments, and fillers. Preferred UV absorbers include benzotriazoles, triazines, and benzophenones. It is preferred that the polyvinyl acetate homopolymer layer be highly reflective. White pigments such as titanium dioxide are preferred for this purpose. Fillers may be selected from a list including calcium carbonate, silica, talc, cement, clay, etc. Hindered amine light stabilizers, LTV absorbers, and/or reflective pigments are intended to provide degradation resistance to the polyvinyl acetate protective coating layer as well as degradation resistance for the pressure sensitive adhesive layer. The combined level of antioxidant, hindered amine light stabilizer and/or LTV absorber is 1% to 25% by weight.

Although not required for good bonding to concrete, the protective coating layer preferably has a penetration less than or equal to 25 dmm (150 g. 5 sec., 70° F.), as measured according to ASTM D 5 (150 g for 5 sec), for good trafficability. The key variables affecting penetration include polyvinyl acetate homopolymer level, polymer type for compositions comprising a blend of polyvinyl acetate homopolymer with another polymer, plasticizer level, and filler level. Increasing the level of polyvinyl acetate homopolymer and/or reducing the amount of plasticizer or blended polymer (i.e., miscible or compatible polymer described previously) will reduce penetration. Adding inorganic filler to the protective coating layer without changing the ratios of other ingredients will decrease penetration.

The polyvinyl acetate homopolymer layer may be formed from a melt, an organic solvent-based coating, or an aqueous based-coating. If formed from a melt, a low-level of pigment and/or filler may be required to achieve adequate ability to coat the layer in comparison to the situation for layers formed from an organic solvent-based composition or an aqueous-based composition. If the coating is formed from a melt, the maximum level of pigments and or filler is 35% by weight.

For a layer formed from an aqueous emulsion-based composition, the preferred minimum level of pigment and or filler is 65% by weight of solids. This will provide for adequate water immersion resistance. Protective coating layers with good water immersion resistance may be produced from an aqueous emulsion providing the aqueous emulsion comprises a high level of inorganic filler. The surfactant or protective colloid from the emulsion is still present in the dry film as a continuous phase, but the surfactant or protective colloid will be distributed over a much larger surface area. Water immersion resistance is adequate for the highly filled coating.

The protective coating layer 6 may optionally include a coating or dusting of finely divided inorganic particulate material on its outer exposed surface. The particulate inorganic material serves to protect the adhesive layer 4 and the protective coating layer 6 from the elements prior to casting concrete against it. Preferably, it also improves the adhesion to post-cast concrete. The particulate inorganic material may include calcium carbonate, sand, silicate sand, cement (including Portland cement, white Portland cement, calcium aluminate cement, calcium sulfoaluminate cement), talc, titanium dioxide, slate dust, granite dust, clay, fly ash, slag, metakaolinite, alumina trihydrate, hydrated ground cement (including Portland cement, white Portland cement, calcium aluminate cement, calcium sulfoaluminate cement), partially hydrated cement (including Portland cement, white Portland cement, calcium aluminate cement, calcium sulfoaluminate cement), and mixtures of two or more of these materials. Preferably, the particulate inorganic material will have an average particle size in the range of about 0.1-1000 μm, and more preferably in the range of about 0.2 to 100 μm.

Although not required, the waterproofing membrane may include a removable release sheet (not shown) on the protective coating layer 6. The release sheet comprises a film or paper that is coated with a release agent, preferably a silicone. The film may comprise polyethylene, polypropylene, polyethylene terephthalate, or polyamide. A paper release sheet may also be coated with a polyolefin layer prior to being coated on the polyolefin face with a silicone release agent. The thickness of the release sheet is typically about 0.01-0.13 mm (about 0.5-5 mils).

The waterproofing membrane may be manufactured in a continuous web coating operation with two coating stations. Pressure sensitive adhesive is applied at one coating station and the polyvinyl acetate layer is applied at the second coating station. The pressure sensitive adhesive may be coated on to the carrier sheet as a hot melt by a coating device selected from a list including knife over roll coater, slot die coater, or roll coater. This two layer construction comprising a carrier sheet and the pressure sensitive adhesive may be cooled. Then the polyvinyl acetate layer may be coated (e.g., by hot melt, solvent or emulsion) onto the exposed face of the pressure sensitive adhesive by a coating device selected from the list including knife over roll coater, slot die coater, or roll coater. The polyvinyl acetate layer may be coated at the same width as the pressure sensitive adhesive or alternatively, it may be coated at a slightly narrower width than the pressure sensitive adhesive layer, leaving one edge of the pressure sensitive adhesive layer uncoated. This narrow uncoated area, referred to as selvedge, is operable to form an adhesive overlap between two adjoining sheets of membrane. The exposed pressure sensitive adhesive edge may be laminated to a silicone coated release strip that, when removed, will form an adhesive overlap between two adjoining sheets of membrane. In the final step the membrane is wound into a roll.

An alternative construction method involves a two-step process. The protective coating layer may be coated onto either a release liner or carrier sheet, then wound into a jumbo roll. This roll is unwound and the pressure sensitive adhesive layer is coated onto the combination of release liner and protective coating or onto the combination of carrier sheet and protective coating, then the laminate is wound into a roll. As a further alternative construction method, the method described in copending application U.S. Ser. No. 61/107,809, filed on Oct. 23, 2008, the disclosure of which is incorporated herein by reference, may be used.

The invention may be better understood by reference to the following examples.

EXAMPLE 1

The properties of certain polymers and copolymers are given in Table 1. Penetration values (dmm) are measured according to ASTM D5 with a 150 g load for 5 seconds.

TABLE 1

| No. | Polymer | From source | Tg (° C.) | Penetration (dmm) |
|---|---|---|---|---|
| A | PVAc | 40% in MEK | | |
| B | PVAc (90,000 MW) (Vinnapas B100) | Solid | 33 | 1 to 2 |
| C | PVAc (37,000 MW) (Vinnapas B17) | Solid | 33 | 1 to 2 |
| D | PVAc (20,000 MW) (Vinnapas B5) | Solid | 33 | 1 to 2 |
| E | PVAc - co vinyl laurate 20% (Vinnapas B500/VL20) | Solid | 21 | 4 |
| F | PVAc - co vinyl laurate 40% (Vinnapas B500/VL40) | Solid | 0 | 35 |
| G | polymethyl acrylate (Aldrich) | Toluene soln | 6 | |
| H | PVAc - co butyl acrylate (UCAR 357) | Aqueous emulsion | 23 | 4 |
| I | PVAc - co butyl acrylate (UCAR 162) | Aqueous emulsion | 12 | 16 |
| J | PVAc - co acrylate (Flexbond 381) | Aqueous emulsion | 12 | 7 |
| K | PVAc - co acrylate (Flexbond 325) | Aqueous emulsion | 19 | 3 |
| L | PVAc - co ethylene (Airflex 7200) | Aqueous emulsion | 0 | 22 |
| M | PVAc - co ethylene (Airflex 400) | Aqueous emulsion | 0 | 8 |

EXAMPLE 2

Protective coating layers comprising polyvinyl acetate are prepared in two ways. In one method, a solution of the homopolymer and other ingredients in methyl ethyl ketone (MEK) (or MEK plus toluene for the blend comprising polyvinyl acetate homopolymer and polymethyl acrylate) is prepared. For polymers in emulsion form, the emulsion is first cast into a thick film, dried to remove all water, and then dissolved in MEK. Fillers, plasticizers and stabilizers are added as desired. Additional MEK is added to achieve a desired solids level. A second method involves preparing a formulation in the melt and coating with a laboratory scale roll coater onto a silicone coated PET release liner.

The solvent based coatings are cast with a draw down bar on to either a silicone coated PET film or a sheet of high-density polyethylene that is not corona treated. The latter substrate is used only if the solution fails to adequately wet the silicone coated PET. Coatings are dried for one hour at 200° F. in a forced hot air oven to ensure solvent removal. The dry film thickness is one mil, but can be thinner as desired.

Waterproofing membranes are prepared as follows. Membranes are prepared with a non-bituminous SIS pressure sensitive adhesive and with a bituminous pressure sensitive adhesive. The SIS pressure sensitive adhesive comprises 28% SIS block copolymer, 57% C-5 tackifier, and 15% naphthenic oil. The bituminous adhesive comprises 12% SBS block copolymer, 71% asphalt, and 17% aromatic oil. A two-layer construction comprising 16 mil HDPE sheet (non-corona treaed) and 15 mils of the SIS pressure sensitive adhesive is prepared. In addition, a two-layer construction comprising four mil HDPE film (Valeron, corona treated) and 36 mils of the bituminous pressure sensitive adhesive is prepared. Onto the pressure sensitive adhesive face of these two layer constructions is laminated by hand a 1 ml thick PVAc coating, described above. The silicone coated PET film or the non-Corona treated HDPE film onto which the PVAc films are originally cast is then removed leaving three layer laminates comprising carrier sheet, pressure sensitive adhesive layer, and polyvinyl acetate protective coating layer. These laminate compositions are shown in Table 2.

TABLE 2

| No. | PVAc type | Other Polymer | Plasticizer | Filler % | Carrier/PSA |
|---|---|---|---|---|---|
| 1 | B | | | | 16 HDPE/SIS |
| 2 | C | | | | 16 HDPE/SIS |
| 3 | C* | | | | 16 HDPE/SIS |
| 4 | B | | 20% | | 16 HDPE/SIS |
| 5 | A** | | | CaCO$_3$ 66% TiO$_2$ 8.6% | 16 HDPE/SIS |
| 6 | A | | | TiO$_2$ 30% | 4 HDPE/Bitum |
| 7 | B | G (50%) | | | 16 HDPE/SIS |
| 8 | B | E (50%) | | | 16 HDPE/SIS |
| 9 | B | K (20%) | | | 16 HDPE/SIS |

*Applied as hot melt rather than solution
**Also includes as stabilizer 0.5% Tinuvin 1130 and 0.5% Tinuvin 292

The above-described membranes are tested for bond to concrete, resistance to de-bonding of the polyvinyl acetate layer from the pressure sensitive adhesive after water soak, and blocking of the polyvinyl acetate layer to the carrier. Concrete is cast against the polyvinyl acetate face of a 1 inch wide sample of each membrane and allowed to cure for seven days. For bond to concrete, peel adhesion is measured with an Instron mechanical testing machine at an angle of 90° and a peel rate of 2 in./min.

It is undesirable for the polyvinyl acetate coating to strongly adhere to the carrier sheet since this will make it difficult to unwind the roll. To test this blocking property, the polyvinyl acetate face of each membrane is contacted with a correspondingly similar HDPE layer to the HDPE layer that forms the carrier sheet layer of the membrane. A 2 psi load is placed on the sandwich and the sandwich is placed in an oven at 150° F. for at least three days. After removing from the oven and cooling, the samples are peeled apart by hand to test the ability of the HDPE sheets to release easily from the polyvinyl acetate face of the three layer membrane.

To test adhesion of the protective coating layer to the pressure sensitive adhesive layer under immersion conditions, each membrane sample is immersed in water. Adhesion of the polyvinyl acetate protective coating layer to the pressure sensitive adhesive layer is evaluated by visual inspection and by attempting to remove the polyvinyl acetate layer from the pressure sensitive adhesive layer via hand abrasion.

The results of the above-described tests are shown in Table 3. All specimens exhibit good bond to concrete. All specimens except for number 6 (with corona treated HDPE) exhibit good blocking resistance. The carrier for all of the other samples is a non-Corona treated 16 mil HDPE sheet that has a low surface energy and does not adhere well to the protective coating. All samples that were tested for water immersion resistance exhibit good water immersion resistance.

TABLE 3

| No. | Blocking | Water Immersion | Bond to Concrete (pli) |
|---|---|---|---|
| 1 | pass 7 days | pass 12 days | 10.5 |
| 2 | pass 7 days | pass 18 days | 11.4 |
| 3 | pass 6 days | not tested | 14.2 |
| 4 | pass 5 days | pass 12 days | 14.3 |
| 5 | pass 4 days | not tested | 10.9 |
| 6 | fail 2 days* | not tested | 10.2 |
| 7 | pass 3 days | not tested | 14.0 |
| 8 | pass 7 days | pass 6 days | 13.6 |
| 9 | not tested | pass 6 days | 13.7 |

*This is corona treated 4 mil HDPE

The invention claimed is:

1. A method of waterproofing a concrete structure comprising:
    applying a waterproofing membrane sheet-like laminate in accordance with any preceding claim to a building substrate or concrete form, the sheet-like laminate comprising a carrier sheet having two surfaces, a pressure sensitive adhesive layer on one surface of the carrier sheet wherein the pressure sensitive adhesive has a penetration greater than 30 decimillimeters (dmm) measured in accordance with ASTM D 5-73, at 150 g, 5 sec., 70° F.; and a protective coating layer on the pressure-sensitive adhesive layer, wherein the protective coating layer comprises a blend of a polyvinyl acetate homopolymer in an amount of at least 40% by weight of the protective coating layer and a copolymer of vinyl acetate and vinyl laurate, wherein the vinyl laurate is present in an amount of at least 20% by weight, the protective coating layer of said membrane sheet-like laminate facing the area into which the concrete will be cast and being effective to protect the membrane against weather exposure and foot traffic and to adhere to concrete cast against it; and
    casting concrete such that it contacts the protective coating layer of the membrane.

2. The method of claim 1 wherein the protective coating layer includes a softening material for the polyvinyl acetate homopolymer.

3. The method of claim 2 wherein the softening material for the polyvinyl acetate homopolymer comprises a flexible polymer that is miscible or compatible with the polyvinyl acetate homopolymer.

4. The method of claim 3 wherein the flexible polymer for the polyvinyl acetate homopolymer is chosen from chlorinated paraffins, polymethylacrylate, polyethylacrylate, copolymers of methyl acrylate and acrylic acid, copolymers of ethyl acrylate and acrylic acid, copolymers of butyl acrylate and acrylic acid, copolymers of vinyl acetate with ethylene, copolymers of vinyl acetate and acrylic esters including methyl acrylate, ethyl acrylate, butyl acrylate, and ethyl-hexyl acrylate, and copolymers of vinyl acetate and vinyl versatate.

5. The method of claim 1 additionally including a coating or dusting of finely divided inorganic particulate material on the exposed surface of the protective coating layer.

6. The method of claim 1 wherein the carrier sheet comprises a film comprising polyethylene, polypropylene, ethylene-propylene copolymer, ethylene-olefin copolymer, ethylene-vinyl acetate copolymer, polyvinyl acetate, polyethyl acrylate, polytetrafluoroethylene, polyvinylidene fluoride, polyethylene terephthalate, polyvinyl chloride, polyamide and combinations thereof, or a woven or non-woven fabric comprising polyethylene, polypropylene, polyolefin, polyethylene terephthalate, glass, or polyamide.

7. The method of claim 1 wherein the adhesive layer comprises a synthetic pressure sensitive adhesive or a rubber modified bitumen pressure sensitive adhesive.

8. The method of claim 1 wherein the adhesive layer comprises a synthetic pressure sensitive adhesive comprising a butyl rubber based adhesive, a polyisobutylene based adhesive, a butyl based adhesive, an acrylic based adhesive, a vinyl ether based adhesive, a styrene-isoprene-styrene (SIS) based adhesive, a styrene-ethylene-butylene-styrene (SEBS) based adhesive, a styrene-butadiene-styrene (SBS) based adhesive, a styrene-butadiene rubber (SBR) based adhesive, or a combination of two or more of these materials.

9. The method of claim 1 additionally comprising a removable release sheet on the protective coating layer.

10. A method of waterproofing a concrete structure comprising:
providing a waterproofing membrane sheet-like laminate in rolled form and unrolling the laminate without use of a release sheet;
applying the waterproofing membrane sheet-like laminate to a building substrate or concrete form, the sheet-like laminate comprising a carrier sheet having two surfaces, a pressure sensitive adhesive layer on one surface of the carrier sheet wherein the pressure sensitive adhesive has a penetration greater than 30 decimillimeters (dmm) measured in accordance with ASTM D 5-73, at 150 g, 5 sec., 70° F.; and a protective coating layer on the pressure-sensitive adhesive layer, wherein the protective coating layer comprises a blend of a polyvinyl acetate homopolymer in an amount of at least 40% by weight of the protective coating layer and a copolymer of vinyl acetate and vinyl laurate, wherein the vinyl laurate is present in an amount of at least 20% by weight, the protective coating layer of said membrane sheet-like laminate facing the area into which the concrete will be cast and being effective to protect the membrane against weather exposure and foot traffic and to adhere to concrete cast against it; and
casting concrete such that it contacts the protective coating layer of the membrane and becomes adhered to the waterproofing membrane sheet-like laminate.

\* \* \* \* \*